United States Patent [19]

Asano et al.

[11] Patent Number: 5,047,792
[45] Date of Patent: Sep. 10, 1991

[54] CAMERA

[75] Inventors: Seiji Asano; Junichi Takagi; Takaji Kono, all of Saitama, Japan

[73] Assignee: Fuji Photo Film Co., Ltd., Kanagawa, Japan

[21] Appl. No.: 597,764

[22] Filed: Oct. 15, 1990

[30] Foreign Application Priority Data

Oct. 16, 1989 [JP] Japan .................................. 1-268529
Nov. 15, 1989 [JP] Japan .................................. 1-296566

[51] Int. Cl.⁵ .................... G03B 3/00; G03B 13/12; G03B 15/05
[52] U.S. Cl. ........................ 354/149.11; 354/195.11; 354/195.12; 354/222
[58] Field of Search ................ 354/149.11, 195.11, 354/195.12, 222

[56] References Cited

U.S. PATENT DOCUMENTS

4,119,983 10/1978 Tanaka ...................... 354/195.12 X

Primary Examiner—Michael L. Gellner
Attorney, Agent, or Firm—Young & Thompson

[57] ABSTRACT

A camera having a standard taking lens and a macro lens which are held in a lens holder rotatable in a plane perpendicular to the photographic light path, whereby either one of standard and macro lenses can be inserted selectively into the light path. The macro lens is smaller in diameter than the standard lens so as to distinguish the lenses from each other during manufacture and assembly. When the macro lens is placed in the photographic light path, switching means turns a charge switch on, thereby to charge a main condenser for flashing. In macrophotography, upon depression of a shutter release button, flash light is automatically emitted.

16 Claims, 6 Drawing Sheets

CAMERA

BACKGROUND OF THE INVENTION

The present invention relates to a camera, especially to a camera having two lens systems which can be switched over therebetween by means of a simple switching mechanism.

Lens-fitted photographic film packages are known which provide a kind of cheap throw-away camera. Such a lens-fitted photographic film package is adapted to focus on any subject in a range from about 1 m to infinity without the need for adjusting the focus of the taking lens. But such a lens-fitted photographic film package cannot focus on a subject nearer than 1 m, so that it cannot satisfy the requirement of close-up photography of flowers, characters on a document or the like.

Considering the above disadvantages, it has been suggested to provide a simple lens changeover mechanism wherein a single-element standard lens and a single-element macro lens are disposed side by side in a common lens holder which is rotatable in a plane perpendicular to the exposure light path, so that either one of these lenses can be used for photographing. This type of lens changeover mechanism is easy to operate and is simple in construction compared with conventional close-up lens systems wherein a supplementary lens is attached to a standard taking lens or the taking lens system itself is mechanically moved. In addition to the above advantages, because it can be manufactured at a low cost, this type of lens changeover mechanism is preferable to a lens-fitted photographic film package or other cheap cameras.

However, when manufacturing the above lens-changing mechanism, there would be the possibility of mispositioning the lenses in the common lens holder if the standard lens and the macro lens were not easily distinguishable, because both of these lenses are a single-element lens of a small diameter whose curvatures are not greatly different from each other.

Furthermore, although a single-element taking lens of the above-described conventional cheap camera is fitted into a recess of a corresponding diameter formed in a lens holder and is fixed thereto by a frame having an opening corresponding to the effective aperture of the lens, such a simple construction for holding the lens is not applicable to the above-described lens changeover mechanism because the lens holder should be rotatable in the camera housing.

As is known in the art, it is desirable in close-up photography to enlarge the depth of field because the focussing range of a macro lens is strictly limited. In order to enlarge the depth of field, it is preferable to stop down the aperture, but the possibility of underexposure is increased by this.

SUMMARY OF THE INVENTION

It is therefore an object of the present invention to provide a camera having a lens changeover mechanism which minimizes the possibility of mispositioning the lenses and facilitates holding the lenses securely in the lens holder with a simple construction.

It is another object of the invention to provide a camera in which close-up photography with a stopped-down aperture does not lead to underexposure even though the camera is simple in construction and can be produced at a low cost.

To achieve the above and other objects and advantages, the present invention makes the diameter of the macro lens smaller than that of the standard lens mounted in the lens holder. These lenses are mounted in a lens holder having two different sized apertures. It is preferable to form the lens holder as one body having a plurality of hooks for holding the lenses and corresponding holes formed integrally therewith by molding.

The lens holder is movable in a plane perpendicular to the photographic light path such that either of the taking lenses can be placed in the photographic light path; and when the macro lens is placed in the photographic light path, a switch is turned on to effect the charging of a flash unit.

According to the invention, because the macro lens has a smaller diameter than the standard lens, these lenses are easily distinguishable from each other, so that the lenses will not be mispositioned in the lens holder during manufacture. Furthermore, it becomes possible to make both lenses as compact as possible, which contributes to minimizing the size of the camera body. It is still further preferable to make the size of the frames formed in the lens holder correspond to the respective size of the lenses so as to prevent with certainty the mispositioning of the lenses.

The hooks formed integrally with the lens holder facilitate the fitting of the lenses to the frames. The holes mainly function as ejection holes for removing the lens holder from the mold, but also lighten the lens holder and economize on the material thereof. Therefore, the hooks and holes contribute to improving the efficiency of manufacturing and reducing the cost of the camera.

On the other hand, because the flash unit is always charged when the macro lens is placed in the photographic light path by moving the lens holder, flash light is always emitted upon releasing the shutter during macrophotography. Therefore, it is possible to stop down the aperture for macrophotography so as to extend the depth of field without producing an underexposed photograph.

BRIEF DESCRIPTION OF THE DRAWINGS

The above and other features of the invention will become apparent from the following description of preferred embodiments thereof with reference to the accompanying drawings in which like parts and elements are designated by the same reference numerals throughout the several views of the drawings and wherein.

DETAILED DESCRIPTION OF THE PREFERRED EMBODIMENTS

Figure 1:
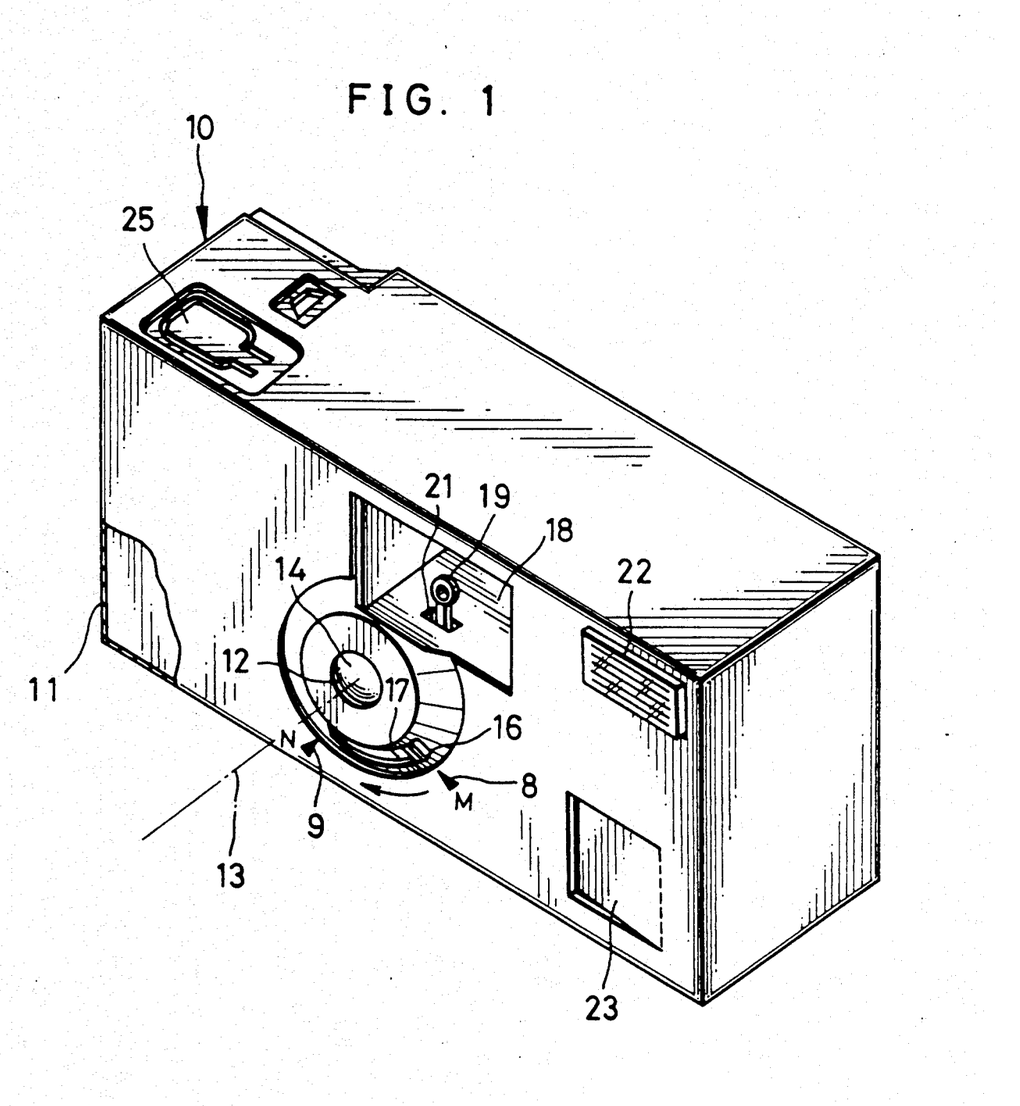
FIG. 1 is a perspective view of a lens-fitted photographic film package embodying the invention.

FIG. 1 shows a lens-fitted photographic film package 10 (hereinafter referred to as a film package) encased in an outer casing 11 made of cardboard or the like formed with a number of cut-outs for exposing a taking lens section, operational members and so forth. The outer casing is printed with symbol marks 8 and 9 for indicating respective switching positions for macro and standard photography. In a front opening 12 of the film package 10, a macro lens 14 is positioned such that the optical axis thereof coincides with an exposure light path 13. In this condition, a switching knob 16 is at the right end of a slot 17, and a target 19 projects into the optical path of viewfinder 18. The target 19 is moved into and out of the path of the viewfinder 18 through a hole 21 formed in the bottom wall of the viewfinder in according with the position of the switching knob 16. A flash window 22 is disposed in the upper right portion of the front surface of the film package. In the top wall of the film package, there is formed a shutter release button 25. Designated by 23 is a charge switch plate for charging a main condenser 44 of a flash unit which will be described in detail with reference to FIG. 2. Upon depressing the charge switch, a synchronizing signal becomes effective which is generated upon depression of the shutter release button 25.

Figure 2:
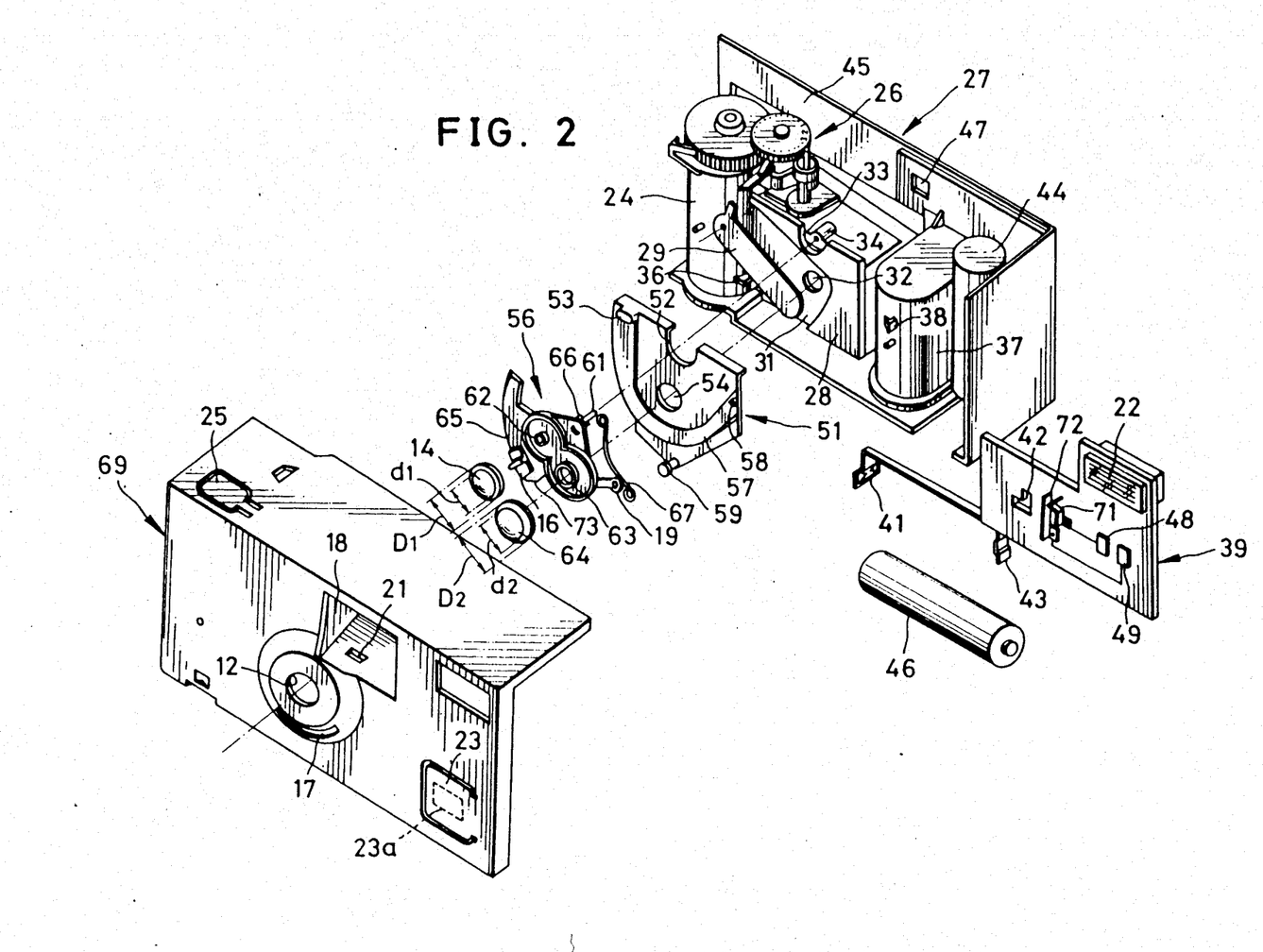
FIG. 2 is an exploded perspective view of the lens-fitted photograrhic film package.

As shown in FIG. 2, the film package comprises substantially a main body section 27, a rear cover section 45 and a front cover section 69. In the main body section 27, there are provided a film take-up chamber 24, a shutter mechanism 26 and a film supply chamber 37. The film take-up chamber 24 contains therein a film magazine from which the entire length of film has been withdrawn and prewound in a roll in the film supply chamber 37, and thereafter the rear cover section 45 is fixed to the main body section 27. The shutter mechanism 26 includes a shutter blade 29 and a shutter base plate 28 which is formed with a recessed portion 31 for allowing the movement of the shutter blade and an exposure opening 32 in the recessed portion. The shutter base plate 28 further has a semi-circular cut-out 33 formed in the top edge thereof, within which a bearing portion 34 is disposed. A look-in window 47 of the viewfinder 18 is formed behind the bearing portion 34 in the rear cover section 45.

The film supply chamber 37 may contain another film magazine receiving therein a roll of film withdrawn from the film magazine in the film take-up chamber 24, and the exposed film is rewound frame-by-frame into the film magazine in the film take-up chamber 24. It is also possible to omit these film magazines and to take up the exposed film on a spool in the film take-up chamber 24.

The main condenser 44 of the flash unit is disposed on the right hand of the film supply chamber 37 as seen in FIG. 2. The flash unit includes a printed circuit board 39 having mounted thereon a flash circuit 39a, the flash window 22 and a pair of contacts 48 and 49. The contacts 48 and 49 can be connected to each other by depressing the charge switch plate 23. On the other hand, the contacts 48 and 49 connect to resilient metal plates 71 and 72, respectively, which are fixedly mounted on the printed circuit board 30 and are normally spaced apart from each other but can be brought into contact with each other. By contacting the metal plates 71 and 72 with each other, the current flows through the contacts 48 and 49. When the metal plates 71 and 72 contact each other, or when the charge switch plate 23 is depressed, a flash circuit 39a is activated to boost the voltage of the dry cell 46, thereby charging the main condenser 44. If the shutter blade 29 is actuated while the flash circuit 39a is active, a synchronizing switch 40 is turned on to generate the synchronizing signal, so that a flash discharge tube 22a in the flash window 22 emits light using the electric energy in the main condenser 44. The printed circuit board 39 is fitted to the main body section 27 with its engaging electrode 41 engaged with a projection 36 formed on the outer surface of the film take-up chamber 24, and is hooked through its L-shaped hole 42 on a hook 38 formed on the outer surface of the film supply chamber 37. In this condition, a dry cell 46 is resiliently retained between the engaging electrode 41 and another electrode 43.

In front of the shutter base plate 28, a shutter cover 51 is mounted, which is formed at its upper portion with a semi-circular cut-out 52 and at its center portion with an exposure opening 54. Below the exposure opening, an arcuate guide rail 57 is formed for guiding the swinging of a lens holder 56 as set forth below. On both ends of the guide rail 57, there are stops 53 and 58 for the lens holder 56.

Figure 3B:
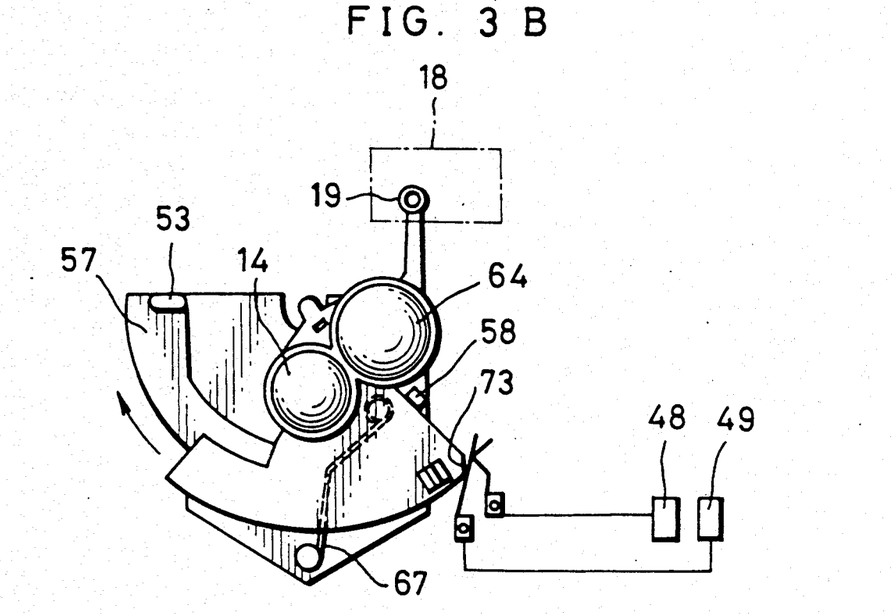
Figure 4:
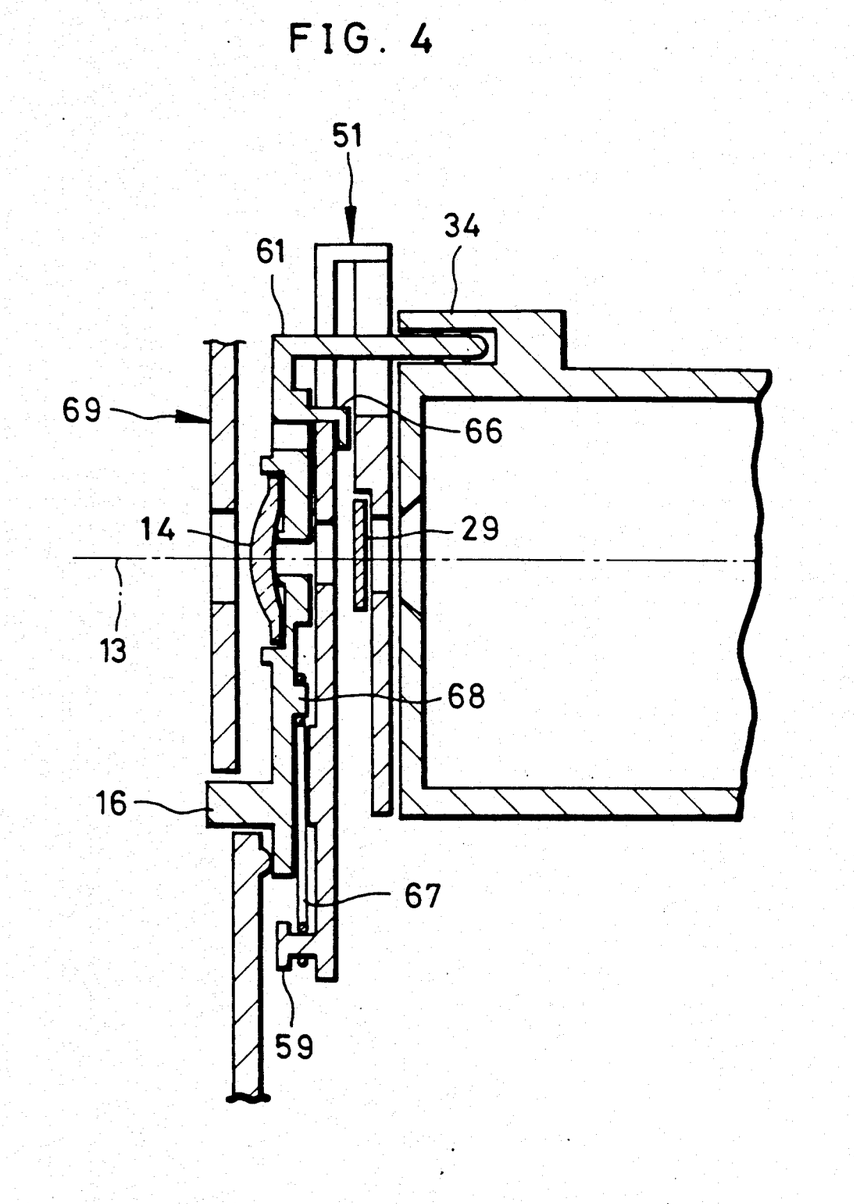
FIG. 4 is a sectional view of essential parts of the lens-fitted film package of FIG. 2.

The lens holder 56 is rotatable about an axle 61 which is inserted in the bearing portion 34, whereby a guide projection 66 slides along the inner surfaces of the cut-outs 33 and 52. As is shown in FIG. 4, in the rear surface of the lens holder 56, there are formed a stepped portion that provides the space for a toggle spring 67, and a pin 68 on which one end of the toggle spring 67 is fixed. The other end of toggle spring 67 is fixed on a pin 59 formed on the shutter cover 51. In this way, the lens holder 56 can be switched over between two positions defined by the stops 52 and 58 by manually pushing the switching knob 16 along the slot 17. The switching knob 16 is formed on a lower sector portion 65 of the lens holder 56. At the right end portion of the sector portion 65 as seen in FIG. 2, there is formed a switching edge 73 which is adapted to bend the metal plate 72 into contact with the metal plate 71 when the lens holder 56 is moved into the macrophotography position wherein the macro lens 14 is positioned in front of the exposure opening 54. In the macrophotography position, the target 19 carried by an upper right portion of the lens holder 56, as seen in FIG. 2, projects into the path of viewfinder 18, as seen in FIGS. 1 and 3B.

The lens holder 56 has a smaller aperture 62 and a larger aperture 63 around which frames for lenses to be fitted therein are formed. The macro lens 14 is fitted in the forward side of the aperture 62, and a standard lens 64 is fitted in the forward side of the aperture 63, and these lenses are made of plastic materials. In this condition, both lenses 14 and 64 are arranged in a common plane perpendicular to the optical axis. In this embodiment, the lens diameter d1 and the flange diameter D1 of the macro lens 14 are 7 mm and 10 mm, respectively, while the lens diameter d2 and the flange diameter D2 of the standard lens 64 are 10 mm and 12 mm, respectively. As the lens diameter d2 is larger than d1, it is apparent which of the lenses is the macro lens 14. In addition, as the frame diameters D1 and D2 are different, it is impossible to fit the lenses into the wrong flanges. Furthermore, because the distances from the lenses to the film surface are substantially equal, it becomes possible to minimize the distance between the lenses and the thickness of the lenses holders, so that the lens holder 56 can be compact.

The macro lens 14 has, for example, a focal length of 33 mm, an f-number of f27, and a focusable subject distance range of 0.4 to 1.2 m comprising the depth of field. The standard lens 64 has, for example, a focal length of 35 mm, an f-number of f11, and focusable subject distance range from 1.2 m to infinity comprising the depth of field. The aperture 62 is made smaller so as to increase the depth of field of the macro lens 14.

The film package 10 is assembled by securing the front cover section 69 formed with the opening 12, the viewfinder 18 and so forth to the main body section 27.

The operation of this first embodiment will now be described with reference to FIGS. 3A and 3B.

Figure 3A:
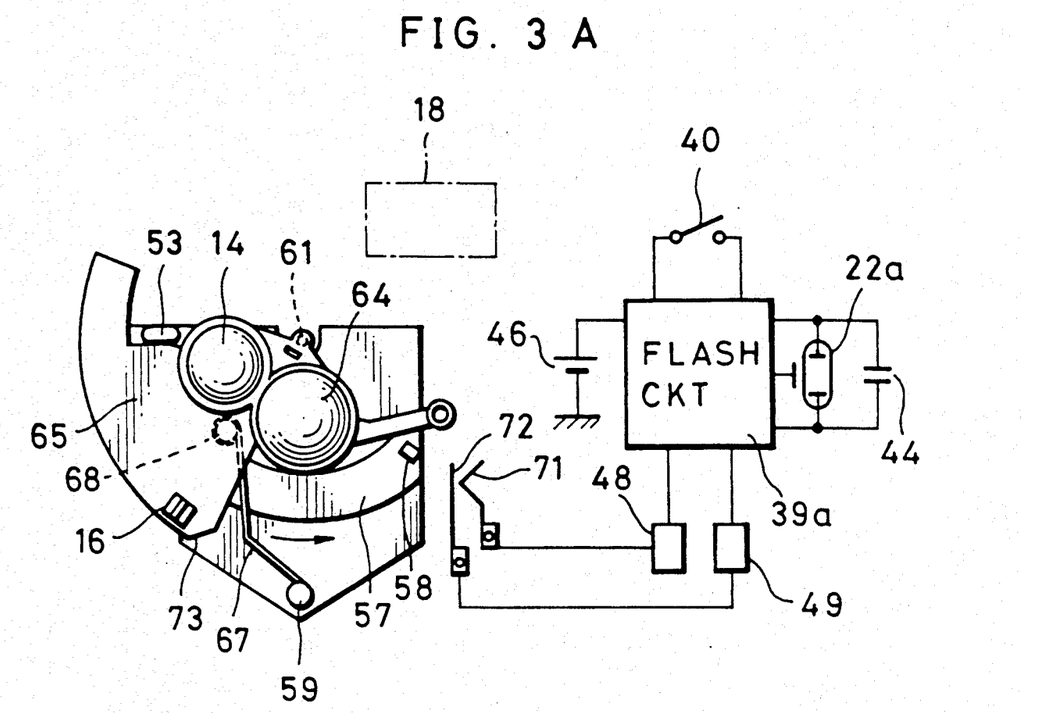
FIGS. 3A and 3B illustrate a lens holder according to a first embodiment of the invention in each of its two different positions of use.

In the standard photography position as shown in FIG. 3A, the lens holder 56 is urged by the toggle spring 67 to rotate clockwise but is stopped by the stop 53. Therefore, the sector portion 65 is pressed against the stop 53 to secure the lens holder 56 in a position wherein the standard lens 64 is properly positioned in the exposure light path 13. In this condition, the film package focuses on any subject disposed in a range from 1.2 m to infinity.

For macrophotography, the switching knob 16 is moved toward the symbol mark 8, thereby to rotate the lens holder 56 counterclockwise against the force of the toggle spring 67 as is shown by an arrow in FIG. 3A. Midway of the counterclockwise rotation of the lens holder 56, the toggle spring 67 moves overcenter and thereafter aids the counterclockwise rotation, so that the lens holder 56 is pressed against the stop 58 to stop fixedly in the position shown in FIG. 3B. Simultaneously, the switching edge 73 bends the metal plate 72 toward the metal plate 71 to bring them into contact with each other. In this position, the macro lens 14 is properly positioned in the exposure light path 13, and the target 19 is raised into the field of view of the viewfinder 18 through the hole 21 so as to indicate the oenter of the field of view for macrophotography, wherein the target mark 19 is displaced from the center of the viewfinder 18, thereby to compensate parallax.

The contacts 48 and 49 become conductive through the contact between the metal plates 71 and 72 even though the flash charge switching plate 23 is not depressed, and so the main condenser 44 is charged. As a result, the flash unit emits light in synchronism with the shutter release merely by depressing the shutter release button 25. In this way, it becomes possible effectively to prevent underexposure during macrophotography that might otherwise be caused by the small aperture 62.

Figure 5:
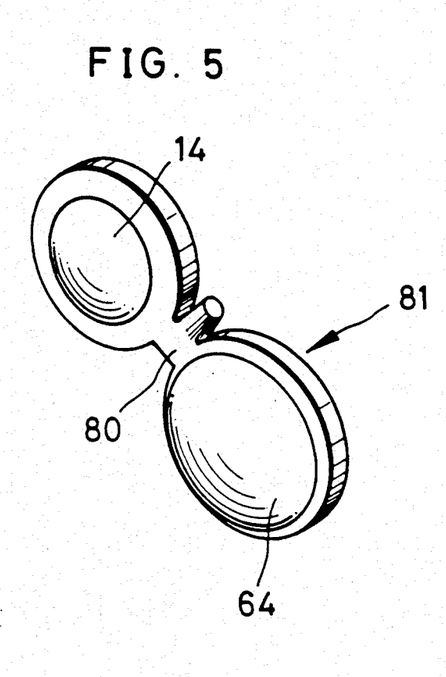
FIG. 5 is a perspective view of a lens unit according to another embodiment of the invention.

Referring now to FIG. 5, it will be seen that the macro lens 14 and the standard lens 64 may be formed integrally as a taking lens unit 81 made of plastic materials, in which these lenses are coupled to each other through a coupling portion 80. The taking lens unit 81 can be mounted in a lens holder similar to that shown in FIG. 2. In this embodiment, because the standard and macro lenses are combined at the time of manufacture, there is no danger of mispositioning the lenses, that is, mounting two macro lenses on the lens holder, for instance. It is preferable to use the coupling portion 80 for injection of the plastic material during molding.

Figure 6:
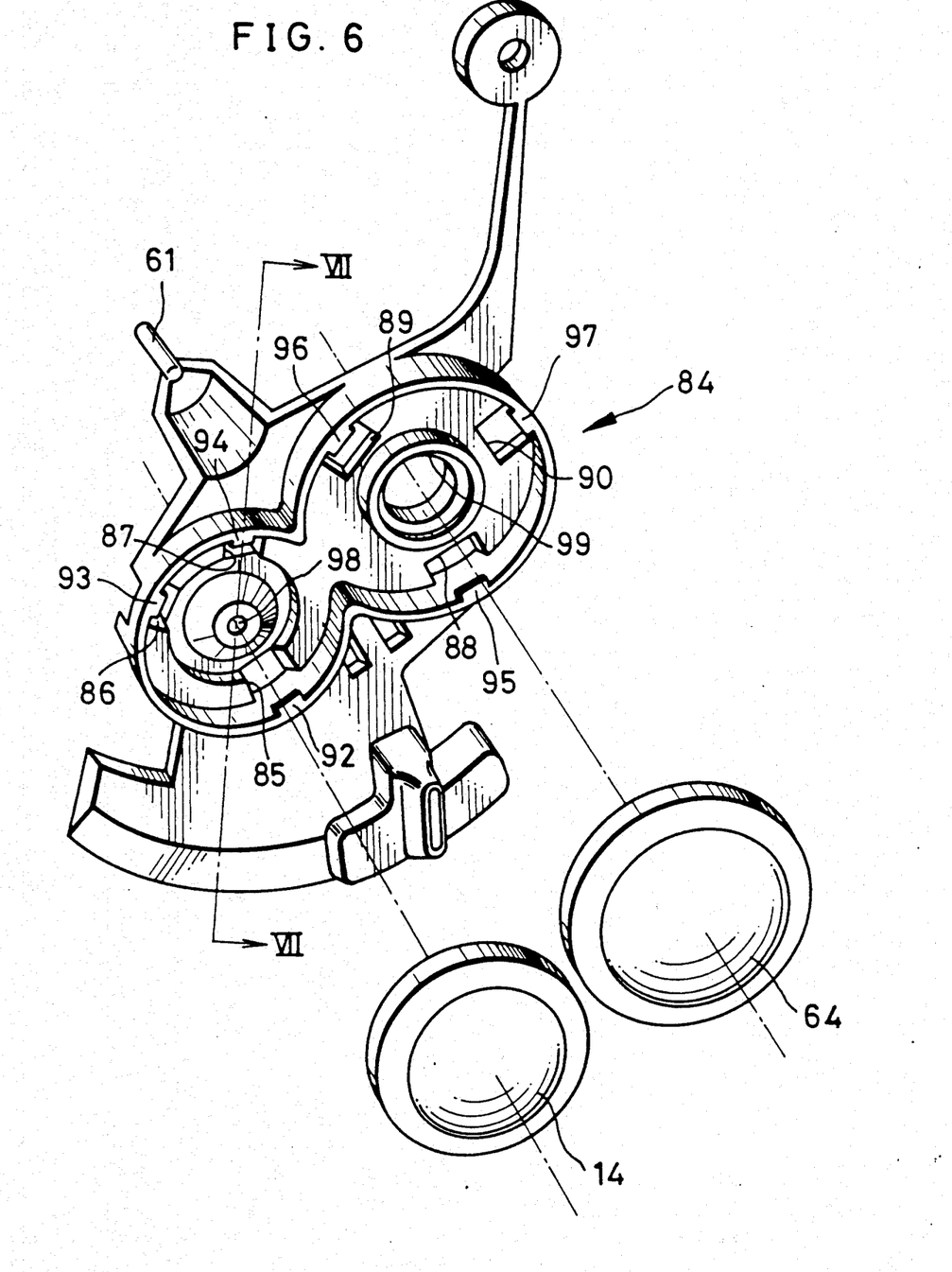
FIG. 6 is an exploded perspective view of a lens holder according to still another embodiment of the invention.

FIG. 6 shows another embodiment of a lens holder 84 for the macro lens 14 and the standard lens 64. In each of two frames for these lenses, there are provided three holes 85, 86 and 87; 88, 89 and 90 and three hooks 92, 93 and 94; 95, 96 and 97 which are formed integrally with the lens holder 84 by molding. Six holes are provided for saving the molding materials and lightening the lens holder, and also function as ejection holes for removing the counterparts of the mold cavities for forming the hooks 92 to 97. The lenses 14 and 64 are snapped in the respective frames and held by these hooks 92 to 97.

Figure 7:
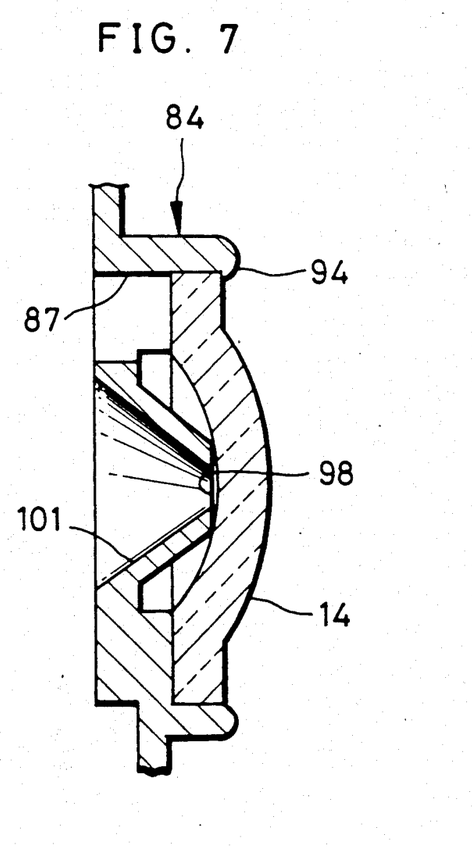
FIG. 7 is a sectional view taken along line VII—VII of FIG. 6 with parts broken away for clarity.

An aperture 98 in the frame for the macro lens 14 is smaller in diameter tan an aperture 99 in the frame for the standard lens 64, and the aperture 98 is formed by a coneshaped hole 101 as is shown in FIG. 7. This construction makes it possible to form the aperture 98 accurately and also facilitates the removal from the metal mold at the end of molding.

The invention has been described in detail with particular reference to preferred embodiments thereof, but it will be understood that variations and modifications can be effected within the spirit and scope of the invention. For example, in case the need for compactness of the camera is not so great, it is possible to make the macro lens 14 larger than the standard lens 64 instead of making it smaller than the standard lens 64 so as to distinguish them from each other. It may also be possible to shape the flanges of these lenses differently; for example, one could be square and the other circular.

Furthermore, the invention may be applicable to other combinations of lenses such as a combination of a standard lens and a telephotographic lens, rather than the above-described combination of a macro and a standard lens. In this case, it is preferable to activate the flash unit as in standard photography.

What is claimed is:

1. A camera comprising:
   a first taking lens;
   a second taking lens having a longer focal length and a different diameter than said first taking lens;
   a lens holder holding said first and second taking lenses, said lens holder being formed with two different sized apertures that register with said first and second taking lenses and being movable in a plane perpendicular to the photographic light path; and
   lens changeover means for moving said lens holder between two positions so as selectively to place either of said taking lenses in the photographic light path.

2. A camera as defined in claim 1, wherein said first taking lens is a macro lens and said second lens is a standard lens.

3. A camera as defined in claim 2, wherein said macro lens registers with the smaller of said apertures, whereas said standard lens registers with the other of said apertures in said lens holder.

4. A camera as defined in claim 2, wherein each of said macro and standard lenses is a single-element plastic lens.

5. A camera as defined in claim 4, wherein said macro and standard lenses are integrally formed as a lens unit.

6. A camera as defined in claim 2, wherein said lens holder is further provided with a target for indicating the center of the field of view for macrophotography, said target being moved into the field of view of the viewfinder when said macro lens is placed in the photographic light path and retracted when said macro lens is moved out of the photographic light path.

7. A camera as defined in claim 2, wherein said lens holder is integrally formed as one body having a plurality of hooks for holding said macro and standard lenses and corresponding ejection holes for enabling the removal of said lens holder from a mold.

8. A camera as defined in claim 1, wherein said lens holder is pivotally mounted in the camera.

9. A camera as defined in claim 8, wherein said lens changeover means include an externally operable member, two stops for limiting the pivoting range of said lens holder, and a toggle spring having two overcenter positions for urging said lens holder against either of said two stops.

10. A camera as defined in claim 1, wherein said camera is a single-use camera factory loaded with a film.

11. A camera as defined in claim 2, further comprising a flash unit, and switching means for effecting the charge for said flash unit when said macro lens is placed in the photographic light path.

12. A camera as defined in claim 11, wherein said switching means comprise a pushing portion formed in said lens holder and a pair of contact segments, and said pushing portion bring one of said contact segments into contact with the other contact segment when said macro lens is placed in the photographic light path.

13. A camera as defined in claim 12, further comprising an externally operable flash switch, said flash switch when actuated charging said flash unit.

14. A camera as defined in claim 13, wherein said flash unit includes a main condenser to be charged while said switching means or said flash switch is actuated, and a flash discharge tube flashing when using the charge in said main condenser.

15. A camera having a rotatable lens holder with two different sized apertures which holds a standard lens in front of the larger aperture and a macro lens in front of the smaller aperture, said lens holder being mounted on the camera for rotation in a plane perpendicular to the optical axis of exposure light entering the camera so as selectively to permit positioning of either of these lenses in the optical axis of exposure light, said macro lens being smaller in diameter than said standard lens.

16. In a camera having a rotatable lens holder holding a standard lens and a macro lens which is mounted on the camera for rotation in a plane perpendicular to the optical axis of exposure light entering the camera so as selectively to permit positioning either of these lenses in said optical axis for photographing; the improvement wherein said lens holder is a one-piece molded plastic body having a plurality of hooks for holding said lenses and corresponding holes for enabling the ejection of said lens holder from a mold.

* * * * *